United States Patent [19]

Toshmitsu

[11] 4,434,446
[45] Feb. 28, 1984

[54] MAGNETIC HEAD

[75] Inventor: Naohiko Toshimitsu, Saitama, Japan

[73] Assignees: Canon Kabushiki Kaisha; Canon Denshi Kabushiki Kaisha, both of Saitama, Japan

[21] Appl. No.: 392,758

[22] Filed: Jun. 28, 1982

Related U.S. Application Data

[63] Continuation of Ser. No. 156,216, Jun. 3, 1980, abandoned.

[30] Foreign Application Priority Data

Jun. 11, 1979 [JP] Japan ................. 54-73647

[51] Int. Cl.³ ............................................ G11B 5/12
[52] U.S. Cl. ..................................................... 360/125
[58] Field of Search ................ 360/125, 126, 119, 122

[56] References Cited

U.S. PATENT DOCUMENTS

| | | | |
|---|---|---|---|
| 3,303,292 | 2/1967 | Bedell et al. | 360/125 |
| 3,480,736 | 11/1969 | Johnson et al. | 360/125 |
| 3,686,468 | 8/1972 | Garnier | 360/119 |
| 3,863,268 | 1/1975 | Ikeda | 360/125 |

Primary Examiner—Robert S. Tupper
Attorney, Agent, or Firm—Fitzpatrick, Cella, Harper & Scinto

[57] ABSTRACT

There is disclosed a magnetic head constructed with a core formed by butt-connecting a plurality of core halves, each having different magnetic flux density or magnetic permeability, and a winding wound around the core, wherein an intense magnetic field is created at the butt-connected portion. One of the core halves has a high magnetic permeability and the other has a high magnetic flux density so as to improve both the output characteristic and reproduction sensitivity of the magnetic head. Further, the core half having a higher magnetic flux density than the other is disposed at the side where a recording medium in motion leaves the head so that a satisfactory recording and erasing magnetic field may be imparted to the recording medium such as metal tape. Furthermore, the core is constructed with a combination of high hardness permalloy having different magnetic flux or magnetic permeability, or a combination of such high hardness permalley and sendust so as to reduce manufacturing cost of the magnetic head.

4 Claims, 3 Drawing Figures

MAGNETIC HEAD

This is a continuation of application Ser. No. 156,216, filed June 3, 1980, now abandoned.

BACKGROUND OF THE INVENTION

1. Field of the Invention

This invention relates to a magnetic head constucted by butt-connecting core halves, in which an intense magnetic field is created in the vicinity of a transducing gap between the core halves.

2. Description of Prior Arts

Previously various magnetic materials such as $\gamma$-$Fe_2O_3$, $CrO_2$, and so on have been used for magnetic recroding media like magnetic tape. In recent years, there has been developed and put into practical use a metal recording tape having magnetic coercive force Hc (approx. 1,000 oersteds) remarkably higher than conventional magnetic materials. To meet such metal tape of improved coercive force, there is a demand for a magnetic head which is capable of effectively creating an intense magnetic field.

As one method of intensifying the magnetic field strength, widening of the gap width in the magnetic head has ben contemplated. This method has already been adopted in the erasing head.

However, the method is not preferable for the recording and reproducing head, because the frequency characteristic thereof in the high frequency region lowered. Therefore, a magnetic head which creates an intense magnetic field without widening the the gap width has been sought.

SUMMARY OF THE INVENTION

It is therefore an object of the present invention to provide a magnetic head formed by butt-connecting core halves, at the magnetic gap portion of which an intense magnetic field is created.

It is another object of the present invention to provide a magnetic head capable of imparting to a metal recording tape an intense magnetic field sufficient for recording and erasing.

It is still another object of the present invention to provide a magnetic head with an improved output characteristic and reproduction sensitivity.

It is yet another object of the present invention to provide a magnetic head of reduced manufacturing cost by using a less expensive material for the core.

DESCRIPTION OF PREFERRED EMBODIMENT

There are four kinds of material having high magnetic permeability (i.e. magnetic material) which are usually used as the core of magnetic heads.

They are: Ferrite, 78% permalloy, high hardness permalloy ("HARDPERM") and sendust (an alloy consisting generally of 85% Fe, 9.5% Si and 5.5% Al).

Figure 1:
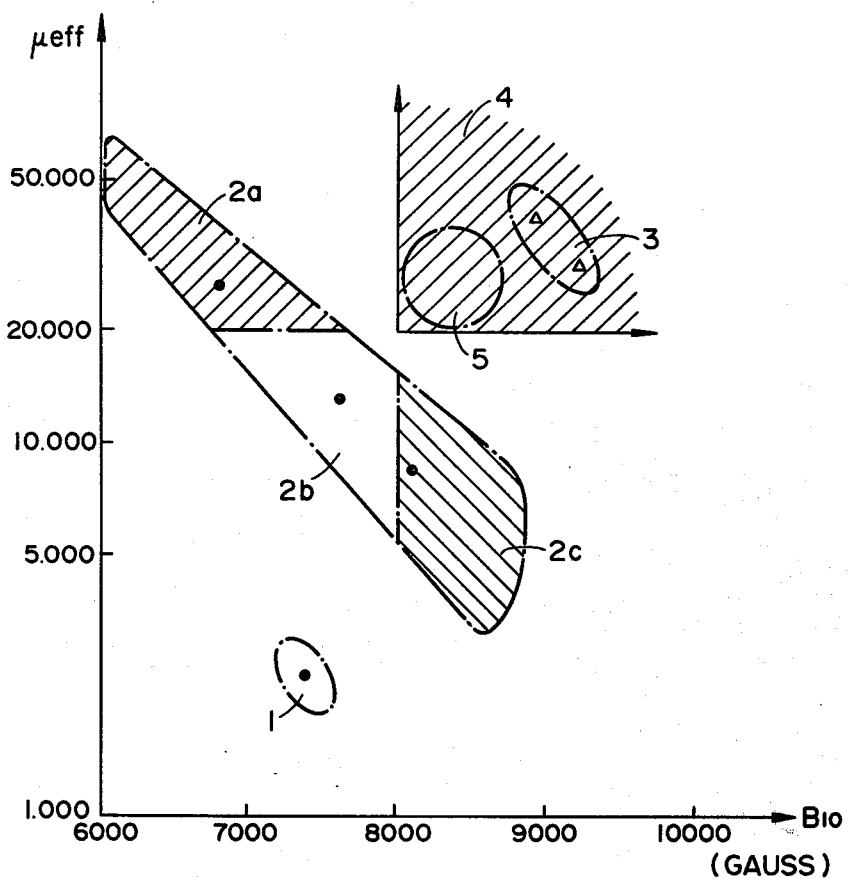
FIG. 1 is a graphical representation showing the relationship between magnetic flux density and magnetic permeability in the core material for the magnetic head.

FIG. 1 shows the inter-relationship between the magnetic flux density and the effective magnetic permeability of these magnetic materials. In the graph, the abscissa denotes the magnetic flux density $B_{10}$ at 10 oersteds and the ordinate represents the effective magnetic permeability $\mu eff$ at 300 Hz.

In this graphical representation, a region denoted by a numeral 1 stands for the 78% permalloy; regions 2a, 2b and 2c are those of the high hardness permalloy; and a region 3 is of the sendust. No region for ferrite appears in the graph, since that magnetic material has the magnetic flux density $B_{10}$ of 6,000 gausses. It should be noted in this connection that the magnetic head for use with the above-mentioned metal tape should employ a core material satisfying the conditions of $B_{10} > 8,000$ and $\mu eff > 20,000$ as indicated by a region 4 in FIG. 1. The only core material which meets such conditions is sendust. However, since sendust is a very expensive material, the manufacturing cost of the magnetic head inevitably becomes high.

The magnetic head of the present invention uses the core material in the region 2c and that in the region 2a ("HARDPERM") in combination to thereby produce an equal result to that of using the core material in a particular region 5 in FIG. 1, hence the magnetic head can be used with metal recording tape.

Figure 2:
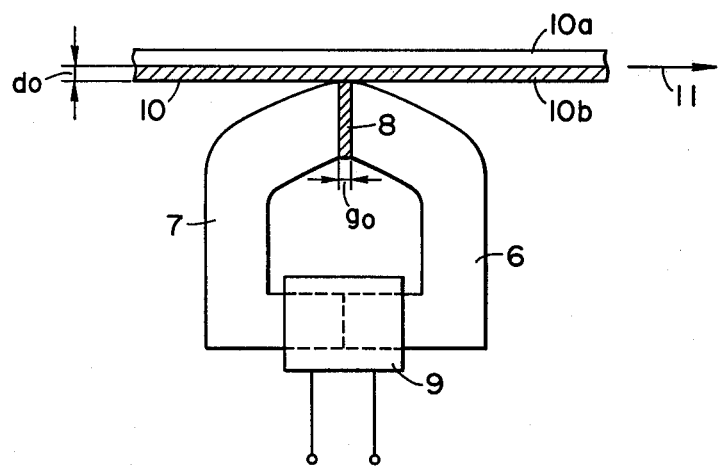
FIG. 2 is a plan view showing the main part of the magnetic head according to the present invention.

Referring to FIG. 2 showing the main part of the magnetic head according to the present invention, a core half 6 (first core half) and another core half 7 (second core half) are mutually butt-connected at one end part thereof with a transducer gap 8 being formed at the other end part (head part) thereof where the metal recording tape travels in slide-contact therewith. A winding 9 is then wound around the butt-connected portion of the core halves, and the magnetic head is thus produced. A magnetic tape 10 manufactured by adhering a magnetic member 10b to a base member 10a travels in the direction of an arrow 11. In this instance, the core half 7 (which is positioned at the side where the tape enters) is formed of a high hardness permalloy having the characteristic as shown by the region 2a in FIG. 1, while the core half 6 (which is positioned at the side where the tape leaves the head) is formed of a high hardness permalloy having the characteristic as shown by the region 2c in FIG. 1. The core half 6 may also be formed of sendust having the characteristic as shown by the region 3 in FIG. 1. The magnetic head of the present invention as constructed in the abovementioned manner can be used with metal recording tape in spite of its being made of the high hardness permalloy (which is less expensive than sendust).

Figure 3:
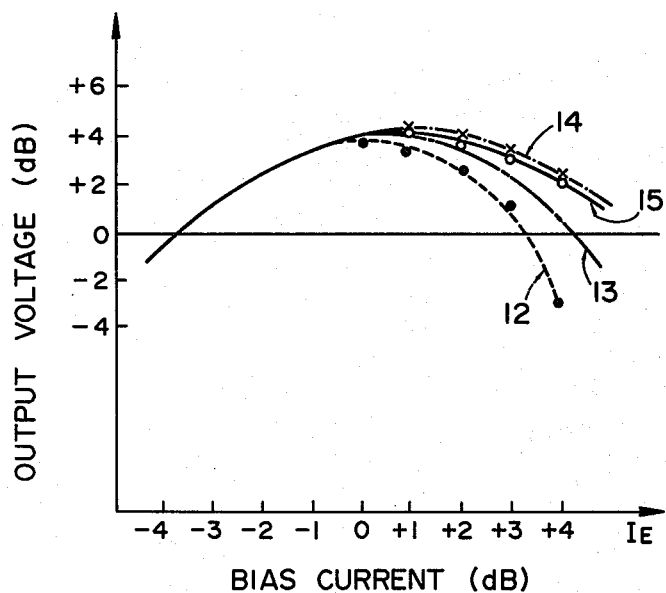
FIG. 3 is a graphical representation showing the output characteristics of the magnetic head.

FIG. 3 is a graphical representation showing the output characteristic of the magnetic head according to the present invention, wherein the abscissa denotes variations in bias current (in a unit of measurement of "dB") and the ordinate represents variations in output voltage (dB) in its maximum output level at 333 Hz and with the distortion of 3%. In the graph, curves 12 to 15 are the measured results of the cores of different materials under the following measuring conditions: a head gap width $g_0 = 1.5$ μm; a thickness $d_0$ of magnetic layer of the recording tape = 4 μm; and a tape travelling speed of 4.75 cm/sec.

The curve 12 is the output characteristic when the high hardness permalloy of $B_{10} = 6,800$ and $\mu eff = 26,000$ (belonging to the region 2a in FIG. 1) is used for the core halves 6 and 7 shown in FIG. 2. The curve 13 is the output characteristic when the high hardness permalloy of $B_{10}=7,600$ and $\mu\text{eff}=13,000$ (belonging to the region 2b in FIG. 1) is used for the core halves 6 and 7 shown in FIG. 2. The curve 14 is the output characteristic when the high hardness permalloy of $B_{10}=8,100$ and $\mu\text{eff}=8,200$ (belonging to the region 2c in FIG. 1) is used for the core halves 6 and 7 shown in FIG. 2.

As the preferred embodiment of the present invention, when a magnetic head composed of the core half 6 (first core half) shown in FIG. 2 and made of the high hardness permalloy of $B_{10}=8,000$ and $\mu\text{eff}=8,200$ (belonging to the region 2c in FIG. 1) and the core half 7 (second core half) made of the high hardness permalloy of $B_{10}=6,800$ and $\mu\text{eff}=26,000$ (belonging to the region 2a in FIG. 1) is subjected to a test under the same conditions as mentioned above, the output characteristic of the magnetic head to be expected is represented by the curve 13. However, the output characteristic of the curve 15 could actually be obtained.

As to the reproduction sensitivity of the magnetic head, the one having the output characteristic of the curve 12 in FIG. 3 shows the highest value of $-68.5$ dBm, while the one having the output characteristic of the curve 14 shows the lowest value of $-70.1$ dBm. (Such favorable output characteristic and reproductions sensitivity are incompatible.)

In contrast to the above, the reproduction sensitivity of the magnetic head according to the present invention is $-68.9$ dBm (which is lower by 0.4 dBm than the head of the curve 12, but higher by 1.2 dBm than the head of the curve 14).

Accordingly, both output charecteristic and reproduction sensitivity indicate satisfactory results, from which it is seen that the same effect as that of using the material belonging to the region 5 in FIG. 1 can be obtained. The basis for this is due to the following reason. Generally speaking, the magnetic recording on the magnetic tape is effected not at the center part of the head gap, but at the side where the recording tape leaves the head (i.e., the front side in the travelling direction of the tape). This is due to the fact that, when a predetermined recording section on the tape is going away from, or leaving, the bias magnetic field in the vicinity of the head gap, the field on the tape gradually decreases and the magnetization is fixed when the magnetic field assumes an appropriate value or below relative to the coercive force Hc of the magnetic particles in the magnetic material. Accordingly, increase in the magnetic flux density B to sufficiently magnetize the tape having a high coercive force Hc is demanded at the core half to the side of the tape leaving the head gap (i.e. the core half 6 in FIG. 2). In order therefore to attain this purpose, the high hardness permalloy belonging to the region 2c in FIG. 1 (or sendust) in used for the core half 6, whereby favorable output characteristics can be obtained as shown in FIG. 3. With respect to the demand for increased magnetic permeability, the high hardness permalloy belonging to the region 2a in FIG. 1 is used for the core half 7, so that high reproduction sensitivity can be obtained. Thus, the magnetic head according to the present invention has improved output characteristics and reproduction sensitivity that result from the use of high hardness permalloy (or sendust), as the first core half, having higher magnetic flux density than the second core half, thereby making it possible to use the magnetic head with the metal recording tape. Further, by use of the magnetic head according to the present invention, the manufacturing cost thereof can be reduced below that of the conventional magnetic head constructed with core halves made of sendust alone.

What I claim is:

1. A magnetic head, comprising:
  a first core half made of high hardness permalloy having magnetic flux density of at least 8,000 gausses;
  a second core half disposed with respect to said first core half at the side where a recording medium in motion enters said magnetic head, said second core half being made of high hardness permalloy having magnetic permeability of at least 20,000; and
  a winding wound around at least a portion of at least one of said core halves.

2. A magnetic head, comprising:
  a first core half made of high hardness permalloy having magnetic flux density of at least 8,000 gausses and magnetic permeability of less than 20,000;
  a second core half disposed with respect to said first core half at the side where a recording medium in motion enters said magnetic head, said second core half being made of high hardness permalloy having magnetic flux density of less than 8,000 gausses and magnetic permeability of at least 20,000; and
  a winding wound around at least a portion of at least one of said core halves.

3. A magnetic head, comprising:
  a first core half made of sendust;
  a second core half disposed with respect to said first core half at the side where a recording medium in motion enters said magnetic head, said second core half being made of high hardness permalloy having magnetic permeability of at least 20,000; and
  a winding wound around at least a portion of at least one of said core halves.

4. A magnetic head, comprising:
  a first core half made of sendust having magnetic flux density of at least 8,000 gausses;
  a second core half disposed with respect to said first core half at the side where a recording medium in motion enters said magnetic head, said second core half being made of high hardness permalloy having magnetic flux density of less than 8,000 gausses and magnetic permeability of at least 20,000; and
  a winding wound around at least a portion of at least one of said core halves.

* * * * *